(12) United States Patent
Frait

(10) Patent No.: US 10,066,741 B2
(45) Date of Patent: Sep. 4, 2018

(54) TRANSMISSION AND HYDRAULIC CONTROL SYSTEM

(71) Applicant: Ford Global Technologies, LLC, Dearborn, MI (US)

(72) Inventor: Steven Anatole Frait, Milan, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/666,636

(22) Filed: Aug. 2, 2017

(65) Prior Publication Data

US 2017/0328466 A1    Nov. 16, 2017

Related U.S. Application Data

(62) Division of application No. 14/533,213, filed on Nov. 5, 2014, now Pat. No. 9,732,847.

(Continued)

(51) Int. Cl.
*F16H 61/14* (2006.01)
*F16H 45/02* (2006.01)
(Continued)

(52) U.S. Cl.
CPC ......... *F16H 61/14* (2013.01); *F16H 61/0021* (2013.01); *F16H 41/30* (2013.01); *F16H 2045/021* (2013.01)

(58) Field of Classification Search
None
See application file for complete search history.

(56) References Cited

U.S. PATENT DOCUMENTS 5,513,732 A * 5/1996 Goates ............... F16H 61/0021
                                                  192/3.3
5,835,876 A * 11/1998 Hathaway ............ F16H 61/12
                                                  477/169

(Continued)

FOREIGN PATENT DOCUMENTS

| CN | 101096997 A | 1/2008 |
|---|---|---|
| CN | 101705995 A | 5/2010 |
| KR | 20060072187 A | 6/2006 |

OTHER PUBLICATIONS

Chinese Office Action dated Jan. 1, 2018 for Chinese Application No. 201510329733.4, 5 pages.

*Primary Examiner* — Jacob S Scott
(74) *Attorney, Agent, or Firm* — James Dottavio; Brooks Kushman P.C.

(57) ABSTRACT

A hydraulic control system for an automatic transmission with a torque converter includes two regulator valves controlled by a single variable force solenoid (VFS). A bypass clutch regulator valve increases the pressure to a bypass clutch apply chamber as the VFS pressure increases. A converter charge regulator valve decreases the pressure in a converter charge circuit as the VFS pressure increases. The converter charge circuit is in series with a lubrication circuit. An orifice restricts the flow through these circuits such that they can be supplied from the line pressure circuit rather than a lower priority circuit. In one embodiment, an on/off solenoid opens a flow control valve to bypass the orifice when additional flow is required. In another embodiment, an electric pump supplements the flow in these circuits when required. This later embodiment includes a switch valve such that the electric pump also supports stop/start operation.

10 Claims, 6 Drawing Sheets

Related U.S. Application Data

(60) Provisional application No. 62/012,786, filed on Jun. 16, 2014.

(51) Int. Cl.
  *F16H 41/30* (2006.01)
  *F16H 61/00* (2006.01)

(56) References Cited

U.S. PATENT DOCUMENTS

| | | | |
|---|---|---|---|
| 6,350,108 B1 | 2/2002 | Haupt | |
| 6,944,529 B2 | 9/2005 | Person et al. | |
| 7,828,128 B2 * | 11/2010 | Frait | F16H 61/143 |
| | | | 192/3.3 |
| 8,323,148 B2 | 12/2012 | Ohashi et al. | |
| 8,454,476 B2 | 6/2013 | Gibson et al. | |
| 8,480,539 B2 | 7/2013 | Hwang et al. | |
| 8,652,002 B2 | 2/2014 | Otanez et al. | |
| 8,826,760 B2 | 9/2014 | Feldt et al. | |
| 9,512,919 B2 * | 12/2016 | Kinch | F16H 63/483 |
| 2007/0187205 A1 | 8/2007 | Gierer et al. | |
| 2010/0236231 A1 * | 9/2010 | Miyabe | F16H 61/0031 |
| | | | 60/413 |
| 2010/0241326 A1 | 9/2010 | Muranaka et al. | |
| 2013/0133766 A1 * | 5/2013 | Hwang | F16H 61/0021 |
| | | | 137/565.13 |
| 2013/0136623 A1 | 5/2013 | Hwang et al. | |
| 2014/0060679 A1 | 3/2014 | Wi et al. | |
| 2014/0064990 A1 | 3/2014 | Jo et al. | |

\* cited by examiner

FIG. 1 – PRIOR ART

TRANSMISSION AND HYDRAULIC CONTROL SYSTEM

CROSS-REFERENCE TO RELATED APPLICATIONS

This application is a division of U.S. application Ser. No. 14/533,213 filed Nov. 5, 2014, now U.S. Pat. No. 9,732,847, issued Aug. 15, 2017 which, in turn, claims the benefit of U.S. provisional application Ser. No. 62/012,786 filed Jun. 16, 2014, the disclosures of which are hereby incorporated in their entirety by reference herein.

TECHNICAL FIELD

This disclosure relates to the field of automatic transmissions for motor vehicles. More particularly, the disclosure relates to a hydraulic control system for a transmission having a torque converter and a bypass clutch.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

FIG. 1 depicts a typical front wheel drive powertrain arrangement. Flow of mechanical power is shown by solid lines. Power is provided by internal combustion engine 10. Transmission input shaft 12 transmits power from the crankshaft of engine 10 to torque converter 14. Torque converter 14 permits the engine to idle while the vehicle is stationary. Torque converter 14 transmits the power to gearbox 16 via turbine shaft 18. In some operating conditions, torque converter 14 may decreases shaft speed and increase shaft torque. Gearbox 16 adjusts the speed and torque according to current vehicle requirements and transmits the power to differential 20. Differential 20 transmits the power to left and right wheels 22 and 24 while permitting slight speed differences when the vehicle turns a corner.

Torque converter 14 requires a supply of fluid to establish a hydrodynamic torque flow path and may also require a supply of pressurized fluid to engage a lock-up clutch. Gearbox 16 requires a supply of fluid for lubrication and cooling. The speed ratio of gearbox 16 is controlled by supplying fluid at controlled pressures to a collection of shift elements such as brakes and clutches. The fluid for these purposes is supplied by pump 26 and regulated by valve body 28. Pump 26 is mechanically driven by the transmission input shaft 12. Pump 26 draws fluid from a sump 30 and provides the fluid to valve body 28 at an elevated pressure called line pressure. Valve body 28 distributes the fluid into a number of separate circuits directed to torque converter 14 and gearbox 16 at various pressures that may be controlled to pressures less than line pressure. In some cases, the valve body directs flow through a cooler 32. Fluid drains from the gearbox and valve body back to the sump 30. Components within the dotted box 34 are typically contained within a common housing and called a transaxle.

SUMMARY OF THE DISCLOSURE

A transmission includes a torque converter, a bypass clutch, and a hydraulic control system having a converter charge circuit, a converter return circuit, a bypass clutch apply circuit, and a lubrication circuit. Pressure in the bypass clutch apply circuit and in the converter charge circuit are controlled by a bypass clutch regulator valve and a converter charge regulator valve, respectively. The bypass clutch regulator valve and the converter charge regulator valve respond to a common variable force solenoid (VFS). In some embodiments, the bypass clutch may define a balance chamber supplied with fluid from the lubrication circuit. The converter charge circuit, which is arranged in series with the converter return circuit and the lubrication circuit, is supplied via the converter charge regulator valve from a line pressure circuit. An orifice restricts the flow in the converter charge circuit, preventing the need to feed these circuits from a lower priority circuit. Alternative mechanisms may increase the flow in the converter charge circuit and the lubrication circuit when necessary. In one embodiment, a flow control valve activated by an on/off solenoid bypasses the orifice to increase flow. In another embodiment, an electric pump provides additional flow when necessary.

In another embodiment, a line pressure circuit is supplied by both a first pump driven by the transmission input shaft and by a second pump driven by an electric motor. A switch valve directs the flow of the electric pump either to the line pressure circuit or to a torque converter charge circuit, based on an on/off solenoid. First and second regulator valves may adjust the pressures in a torque converter charge circuit and a bypass clutch apply circuit, respectively, based on first VFS. A third regulator valve may adjust the pressure in the line pressure circuit based on a second VFS.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
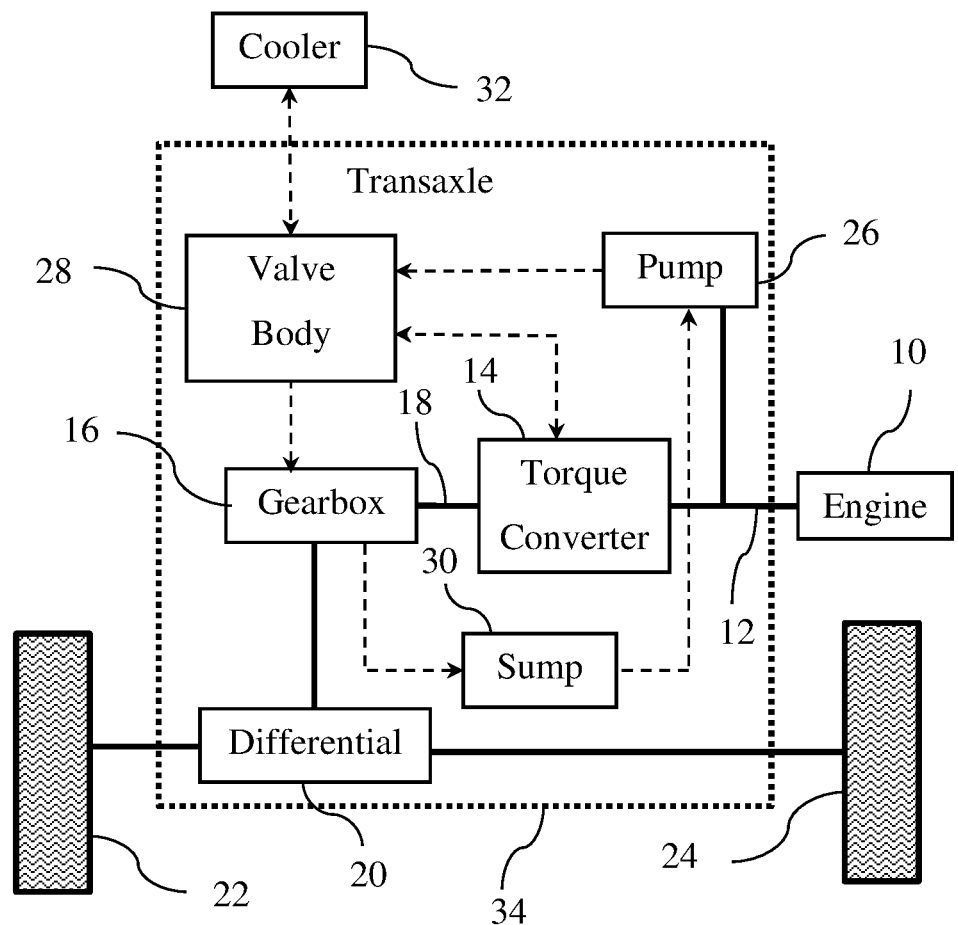
FIG. 1 is a schematic diagram of a vehicle powertrain.
Figure 2:
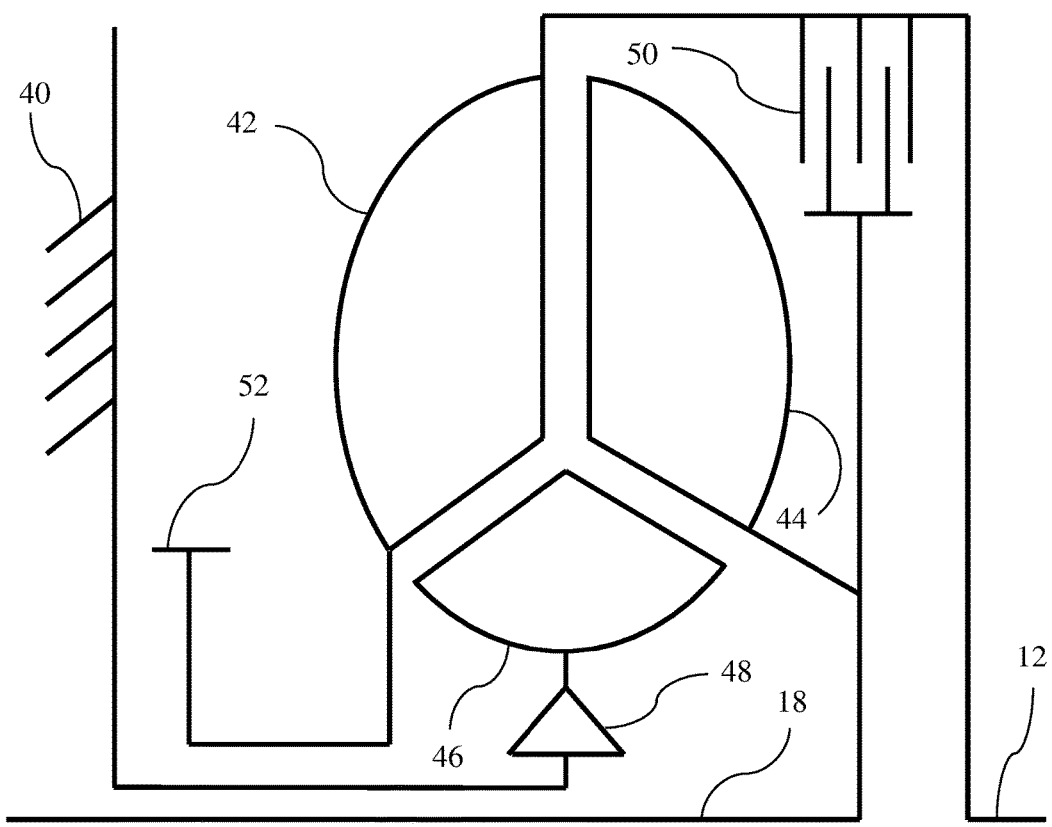
FIG. 2 is a schematic diagram of a torque converter assembly.

FIG. 2 schematically depicts torque converter 14. A stationary front support 40 is fixed to the transaxle housing. Transmission input shaft 12 drives impeller 42. Turbine 44 drives turbine shaft 18. Stator 46 is connected to front support 40 via one way clutch 48. Bypass clutch 50 selectively couples transmission input shaft 12 to turbine shaft 18. Pump drive sprocket 52 is fixed to input shaft 12. Impeller 42, turbine 44, and stator 46 define a torque converter cavity filled with fluid.

Vanes on impeller 42 tend to propel the fluid outwardly in response to rotation of impeller 42. The fluid then exerts torque on vanes of turbine 44 as the fluid circulates inwardly. Vanes on stator 46 redirect the fluid exiting the turbine back into the impeller. Whenever impeller 42 is rotating faster than turbine 44, positive torque is exerted on turbine 44 and resistance torque is exerted on impeller 42. The magnitude of the torque depends upon the relative speeds of the impeller and turbine. Due to the action of the stator, the torque on the turbine may be higher than the resistance torque on the impeller. As the turbine speed approaches the impeller speed, one way clutch 48 overruns allowing stator 46 to rotate.

When bypass clutch 50 is engaged, power is transferred from transmission input shaft 12 to turbine shaft 18 through bypass clutch 50 as opposed to the hydrodynamic power transfer path described above. Because this power transfer path is more efficient than the hydrodynamic power transfer path, it is preferred during steady state cruising situations. However, the hydrodynamic power flow path provides torque multiplication and vibration isolation that make it preferable in other circumstances such as during low speed driving and while gearbox 16 is shifting from one speed ratio to another. The torque capacity of bypass clutch 50 may be regulated such that some power is transferred by each power transfer path.

Figure 3:
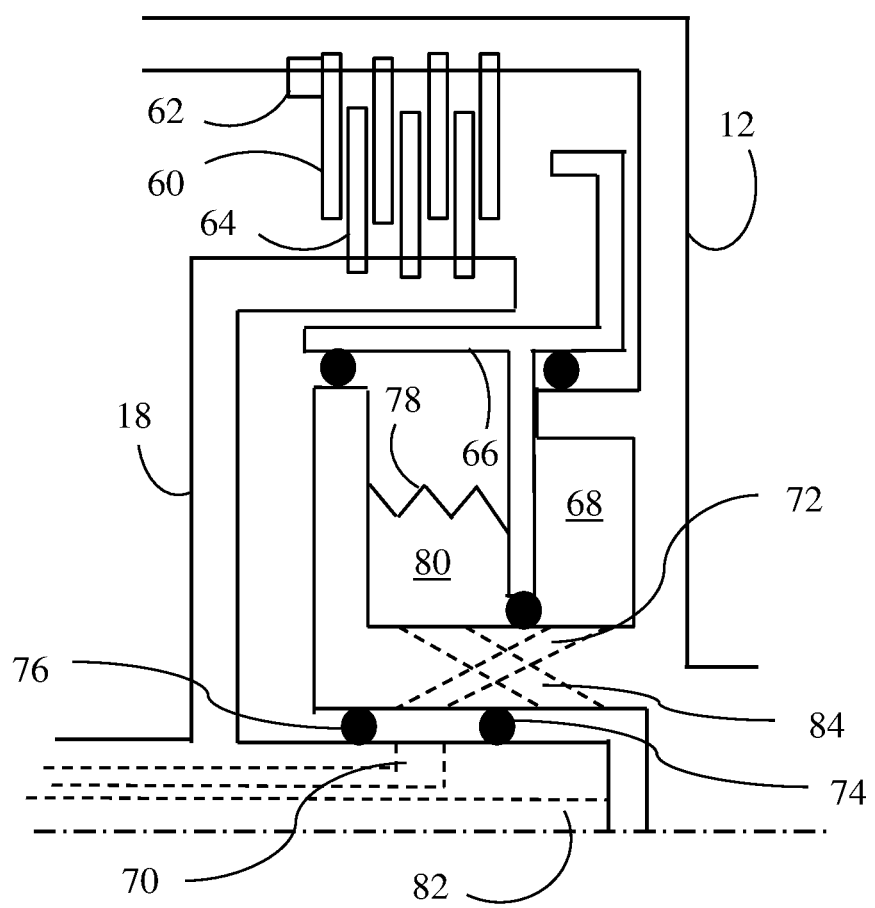
FIG. 3 is a cross sectional view of a bypass clutch.

FIG. 3 shows the structure of bypass clutch 50. A set of friction plates 60 are splined to transmission input shaft 12 such that they are forced to rotate with input shaft 12 but can move axially. A snap ring 62 limits the axial movement toward the left. The friction plates 60 are interleaved with a set of separator plates 64 that are splined to turbine shaft 18. Piston 66 is supported to slide axially with respect to input shaft 12. When pressurized fluid is routed to chamber 68, piston 66 forces the friction plates and separator plates together. Friction between the friction plates and separator plates transmits torque between transmission input shaft 12 and turbine shaft 18. The torque capacity of the clutch is controlled by varying the pressure in apply chamber 68. The pressurized fluid may be routed to apply chamber 68 through a channel 70 in turbine shaft 18 and a channel 72 in input shaft 12. The fluid is directed between channels 70 and 72 by a seals 74 and 76. When fluid pressure is removed, return spring 78 forces the piston to the right to release the clutch.

As input shaft 12 rotates, centrifugal forces cause the pressure in chamber 68 to exceed the pressure in channel 70. Since these forces fluctuate based on input shaft speed, the variations make it difficult to accurately control the torque capacity. To compensate for these fluctuations, fluid at low pressure is routed to balance chamber 80. The fluid may be routed through a channel 82 in turbine shaft 18 and a channel 84 in input shaft 12. Channels 72 and 84 are at different circumferential locations within input shaft 12 such that they do not intersect with one another. Seal 74 directs the flow from channel 82 to channel 84. Balance chamber 80 is designed to have nearly the same area acting on piston 66 as apply chamber 68 and at nearly the same radii such that the centrifugal forces generated in the two chambers cancel one another out.

In an alternative embodiment, fluid at moderate pressure may be routed to balance chamber 80. For example, the fluid circuit used to provide fluid to the torque converter cavity defined by the turbine, impeller, and stator, called the converter charge circuit, may be routed to balance chamber 80. This eliminates the need for return spring 78 because the moderate pressure forces piston 66 to the right when pressure in apply chamber 68 is reduced to a low value. However, the torque capacity is now a function of the difference in pressure between the fluid provided to apply chamber 68 and the fluid provided to balance chamber 80 which can make control difficult in circumstances in which the converter charge pressure fluctuates.

Figure 4:
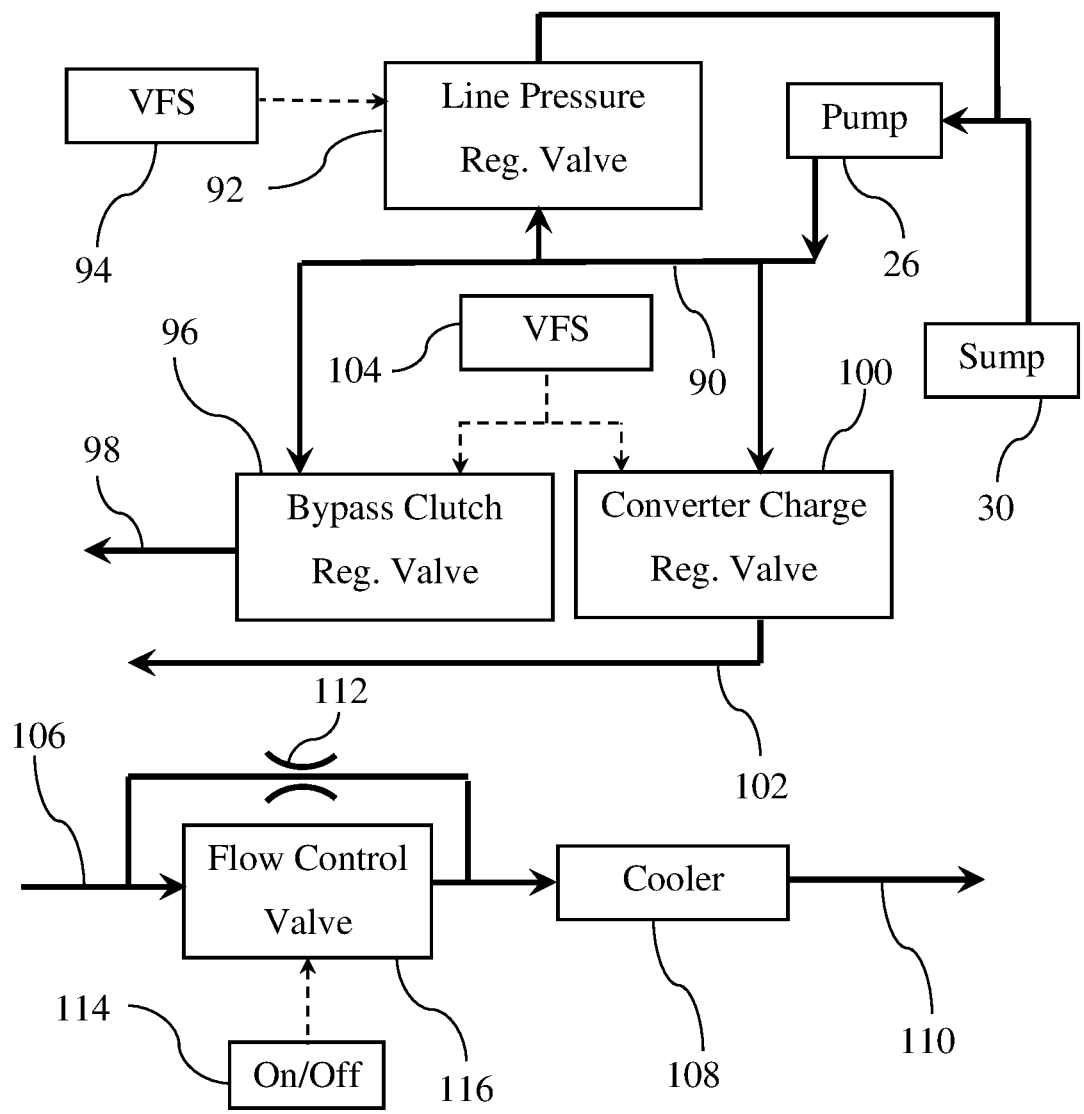
FIG. 4 is a schematic diagram of a portion of a first hydraulic control system.

FIG. 4 is a schematic diagram of a portion of a hydraulic network suitable for use with the torque converter of FIG. 2 and the bypass clutch of FIG. 3. Pump 26 draws fluid from sump 30 and provides the fluid to line pressure circuit 90. The fluid may be drawn through a filter to remove impurities. Regulator valve 92 exhaust a portion of the flow back to the pump inlet port (or alternatively to sump 30) through a valve opening. Regulator valve 92 adjusts the size of the valve opening as necessary to maintain a desired pressure in line pressure circuit 90. A controller may adjust the desired pressure by commanding an electrical current to Variable Force Solenoid (VFS) 94. Pump 26 may be a variable displacement pump in which case the controller may also adjust the line pressure by commanding a change in pump displacement. This has the advantage of reducing the drag torque of pump 26 when lower pressure is required.

Figure 5:
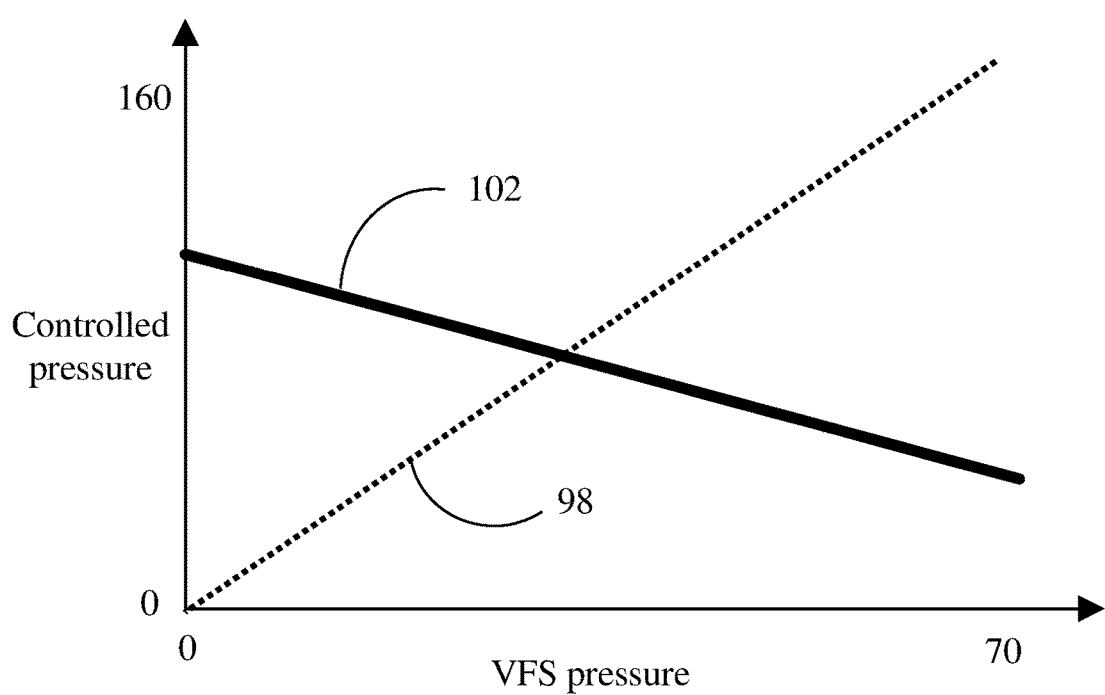
FIG. 5 is a graph of two controlled pressures in the hydraulic control system of FIG. 4 with respect to a VFS pressure.

Bypass clutch regulator valve 96 controls the pressure in bypass clutch circuit 98. The bypass clutch circuit 98 is routed to the bypass clutch apply chamber through passage 70 as described above. Valve 100 controls the pressure in the converter charge circuit 102. Valves 96 and 100 control the pressure to a commanded value less than line pressure by adjusting the sizes of respective valve openings between the line pressure circuit and the respective output circuit such that the pressure drop across the valve openings result in the desired output pressures. Since less pressure is required in the converter charge circuit when the bypass clutch is engaged, these two valves can be controlled by a common VFS 104. As shown in FIG. 5, the VFS generates a control pressure ranging from 0 to about 70 psi based on an electrical current from a controller. In response, bypass clutch regulator valve 96 controls the pressure in bypass clutch apply circuit 98 between 0 and about 160 psi, with the commanded pressure increasing as the VFS pressure increases. At the same time, converter charge regulator valve 100 controls the pressure in converter charge circuit 102 between about 100 psi and about 45 psi, with the commanded pressure decreasing as the VFS pressure increases. These values are merely exemplary and may vary depending upon system parameters. In some instances, non-linear functions may be desirable. If converter charge is being routed to the balance chamber 80, then it may also be routed to valve 96 so that valve 96 can adjust the pressure in the bypass clutch circuit 98 such that the differential pressure acting on the bypass clutch piston is a direct function of the VFS pressure.

Fluid returns from the torque converter chamber in return circuit 106. This circuit is routed through cooler 108 to lube circuit 110. Lube circuit 110 is routed through channel 82 to balance chamber 80. It is also routed to balance chambers of rotating clutches in gearbox 16, to various places in gearbox 16 to provide lubrication for the gears, and through the clutch packs of each of the shift elements in gearbox 16 to provide cooling. A cooler bypass valve, not shown, may divert the fluid around the cooler when the fluid is cold. The lube flow eventually drains back to sump 30 where it is recirculated by pump 26. Orifice 112 is sized to restrict the amount of flow in these circuits to the amount needed to dissipate heat and provide lubrication during normal operating conditions. Excessive flow in this circuit increases drag because the pump must provide more fluid and because the fluid causes windage drag as it returns to the sump. When additional cooling flow is required, a controller commands current to on/off solenoid 114. In response, flow control valve 116 opens allowing additional flow.

In some prior art control systems, converter charge circuit 102 is supplied via a low priority circuit as opposed to a line pressure circuit in order to ensure that adequate flow is available in the line pressure circuit for high demand events such as stroking an oncoming clutch. This could result in pressure variability in the converter charge circuit during such events. Such variability makes control of bypass clutch 50 difficult. The ability to restrict the flow using flow control valve 116 permits converter charge circuit 102 to be supplied via the line pressure circuit so the converter charge pressure remains stable during high flow demand events.

Figure 6:
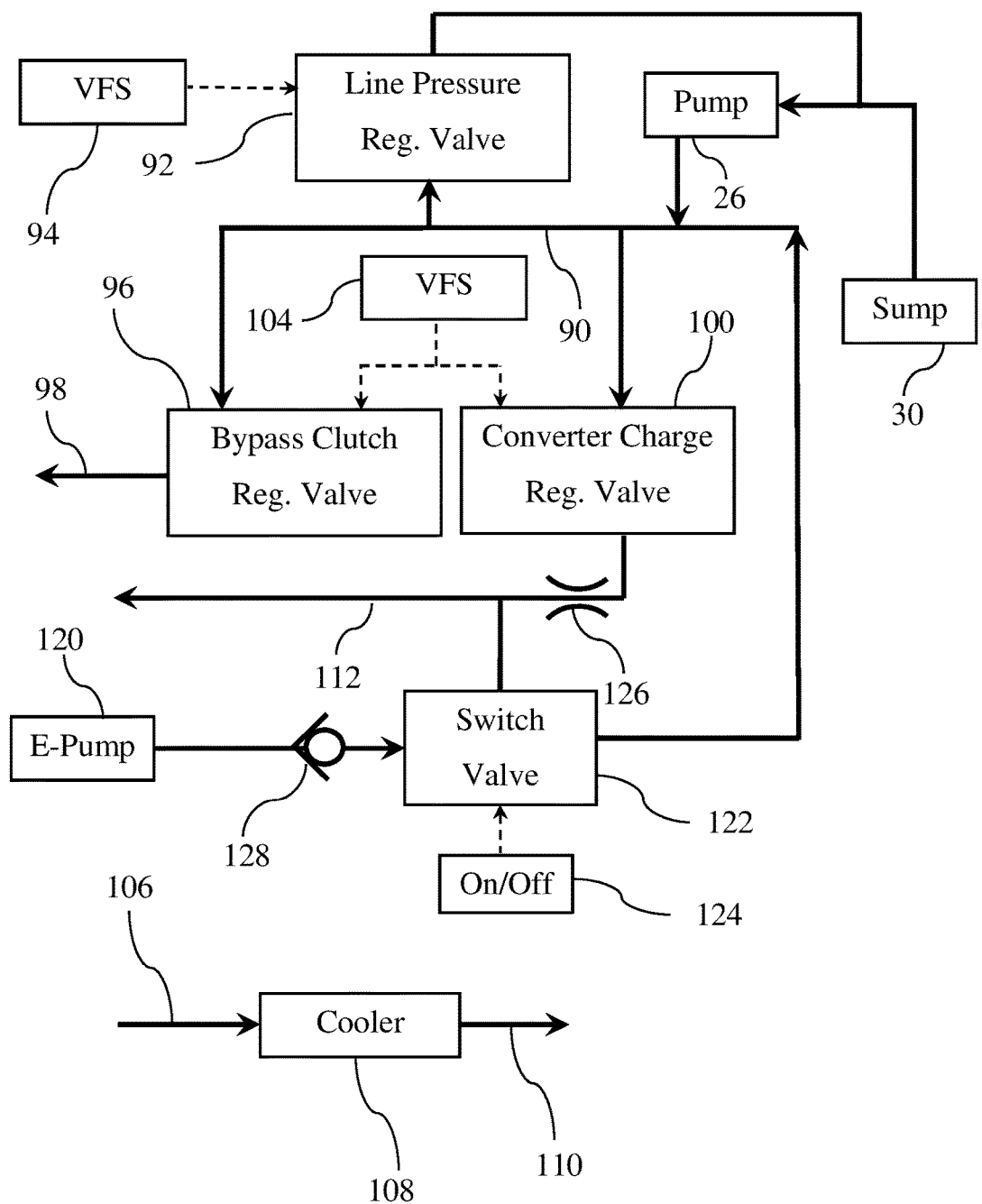
FIG. 6 is a schematic diagram of a portion of a second hydraulic control system.

FIG. 6 is a schematic diagram of a second hydraulic network suitable for use with the torque converter of FIG. 2 and the bypass clutch of FIG. 3. Items that are common with the hydraulic network of FIG. 4 have a common reference number. In addition to engine driven pump 26, a second pump 120 driven by a dedicated electrical motor is provided. Electric pump 120 draws fluid from the same sump 30 as pump 26. Switch valve 122 controls where the outlet of pump 120 flows based on whether or not the controller commands current to on/off solenoid 124. Orifice 126 is sized to allow sufficient cooling and lubrication flow in normal driving conditions. When additional cooling or lubrication flow is needed, switch valve 122 is commanded to direct flow from electric pump 120 to the converter charge circuit 112 which results in increased flow in the converter return circuit 106 and the lube circuit 110. Check ball 128 prevents fluid from back-driving pump 120.

To increase fuel economy, some vehicles are designed to automatically shut the engine off when the vehicle is stationary such as while waiting at a traffic light. When the engine is off, engine driven pump 26 does not provide any fluid flow. If no provision is made for this circumstance, shift elements in the gearbox would lose capacity and the transmission would be in neutral. When the driver releases the brake pedal and presses the accelerator pedal, the gearbox must be in gear in order to provide acceleration. To keep the gearbox in gear, the controller commands switch valve 122 to provide flow from electric pump 120 to the line pressure circuit 90.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
 a torque converter having an impeller, a turbine, and a stator and defining a converter chamber;
 a bypass clutch configured to selectively couple the impeller to the turbine in response to a hydraulic pressure difference between an apply chamber and a balance chamber;
 a hydraulic control system having a converter charge circuit to supply fluid to the converter chamber, a converter return circuit to receive fluid from the converter chamber, a bypass clutch apply circuit in fluid communication with the apply chamber, and a lubrication circuit in series with the converter return circuit;
 a bypass clutch regulator valve configured to adjust a pressure in the bypass clutch apply circuit in response to a current to a variable force solenoid; and
 a converter charge regulator valve configured to adjust a pressure in the converter charge circuit in response to the current to the variable force solenoid.

2. The transmission of claim 1 wherein the lubrication circuit is in fluid communication with the balance chamber.

3. The transmission of claim 1 further comprising a flow control valve configured to adjust a flow rate in the converter return circuit in response to a current to an on/off solenoid.

4. The transmission of claim 1 further comprising:
 an electrically driven pump; and
 a switch valve configured to alternately direct an output of the electric pump to the converter charge circuit or to a line pressure circuit in response to a current to an on/off solenoid.

5. The transmission of claim 1 wherein the converter charge regulator valve adjusts the pressure in the converter charge circuit by adjusting a size of a valve opening connecting a line pressure circuit to the converter charge circuit.

6. A transmission control system comprising:
 a pump configured to supply fluid to a line pressure circuit at a controlled pressure;
 a converter charge regulator valve configured to adjust a size of a valve opening connecting the line pressure circuit to a converter charge circuit in response to a first electric current; and
 a flow control valve configured to adjust a flow rate through the converter charge circuit in response to a second electric current.

7. The control system of claim 6 further comprising:
 a bypass clutch regulator valve configured to adjust the size of a valve opening connecting the line pressure circuit to a bypass clutch apply circuit in response to the first electric current to increase the pressure in the bypass clutch apply circuit as the pressure in the converter charge circuit decreases.

8. A transmission control system comprising:
 a line pressure circuit;

a converter charge regulator valve configured to increase flow from the line pressure circuit to a converter charge circuit in response to a change in first electric current; and a bypass clutch regulator valve configured to decrease flow from the line pressure circuit to a bypass clutch apply circuit in response to the change in the first electric current.

9. The transmission control system of claim 8 further comprising a pump configured to supply fluid to the line pressure circuit at a controlled pressure.

10. The transmission control system of claim 8 further comprising a flow control valve configured to decrease flow through the converter charge circuit in response to a change in a second electric current.

* * * * *